United States Patent
Haintze et al.

(10) Patent No.: US 8,852,336 B2
(45) Date of Patent: Oct. 7, 2014

(54) MANNER OF OBTAINMENT OF BINDING AGENT FOR MASS FOR PRODUCTION OF SHAPED CONSTRUCTION ELEMENTS AND BINDING AGENT FOR MASS FOR PRODUCTION OF SHAPED CONSTRUCTION ELEMENTS

(75) Inventors: Jerzy Haintze, Warsaw (PL); Andrzej Haintze, Lomianki (PL)

(73) Assignee: HCH Spólka z o.o., Warsaw (PL)

( * ) Notice: Subject to any disclaimer, the term of this patent is extended or adjusted under 35 U.S.C. 154(b) by 0 days.

(21) Appl. No.: 13/883,739

(22) PCT Filed: Nov. 10, 2011

(86) PCT No.: PCT/PL2011/000116
§ 371 (c)(1),
(2), (4) Date: May 6, 2013

(87) PCT Pub. No.: WO2012/067528
PCT Pub. Date: May 24, 2012

(65) Prior Publication Data
US 2013/0228101 A1    Sep. 5, 2013

(30) Foreign Application Priority Data
Nov. 15, 2010   (PL) .......................................... 392960

(51) Int. Cl.
| C04B 38/00 | (2006.01) |
| C04B 14/18 | (2006.01) |
| B29C 67/20 | (2006.01) |
| C04B 28/14 | (2006.01) |
| C04B 20/10 | (2006.01) |

(52) U.S. Cl.
CPC ................. B29C 67/20 (2013.01); C04B 28/14 (2013.01); C04B 20/1077 (2013.01); C04B 38/0038 (2013.01)
USPC .............................. 106/698; 264/42; 264/109

(58) Field of Classification Search
None
See application file for complete search history.

(56) References Cited

U.S. PATENT DOCUMENTS

| 4,255,489 | A  | * | 3/1981  | Nielsen ......................... 428/405 |
| 4,313,997 | A  | * | 2/1982  | Ruff et al. ..................... 428/220 |
| 5,902,528 | A  | * | 5/1999  | Spragg ............................ 264/42 |
| 2009/0011207 | A1 | * | 1/2009 | Dubey ........................... 428/219 |
| 2012/0256340 | A1 | * | 10/2012 | Barger .......................... 264/119 |

FOREIGN PATENT DOCUMENTS

| EP | 1172346 A2 | 1/2002 |
| JP | S52140533 A | 11/1977 |
| JP | S57145063 A | 9/1982 |
| JP | S6131372 A | 2/1986 |
| JP | H04254449 A | 9/1992 |
| PL | 329432 A1 | 5/2000 |

* cited by examiner

Primary Examiner — Mary F Theisen
(74) Attorney, Agent, or Firm — Christopher L. Parmelee; Walker & Jocke

(57) ABSTRACT

A method is provided that solves the problem of the manner of obtainment of mass for production of shaped construction elements. The manner consists of the fact, that in the mechanical mixer a ceramic granulate is placed, preferably in the form of perlite and is soaked, preferably with water until complete soaking of the granulate and is mixed with the binding agent until obtainment of the situation, where each loose grain (1) of the granulate is coated with a layer of moist binding agent, creating a coating (2) around the grain. Priorly prepared moulds are filled with the obtained mass. The mass for production of shaped construction elements consists of 15-25% of bond weight, preferably in the form of perlite, 35-45% of binding agent weight, preferably in the form of plaster with improved resistance parameters and 35-45% of water weight.

4 Claims, 1 Drawing Sheet

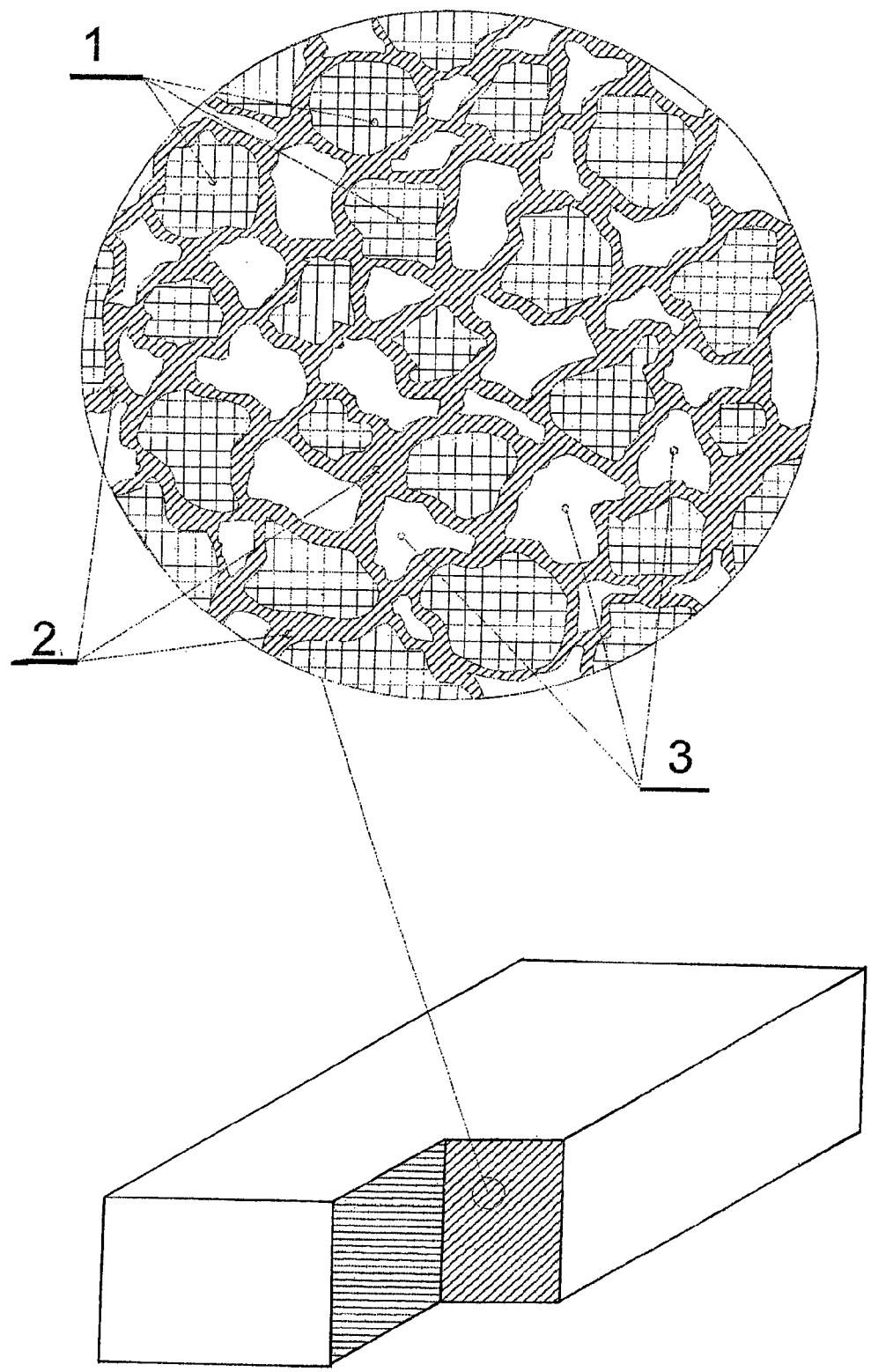

MANNER OF OBTAINMENT OF BINDING AGENT FOR MASS FOR PRODUCTION OF SHAPED CONSTRUCTION ELEMENTS AND BINDING AGENT FOR MASS FOR PRODUCTION OF SHAPED CONSTRUCTION ELEMENTS

The subject matter of the invention is the manner of obtainment of mass for production of shaped construction elements and mass for production of shaped construction elements, which are useful in construction industry, and in particular in production of construction elements in module systems.

From the application on the Polish invention no. P-329 432, the manner of production, especially of microporous concrete mass, is known, which is useful for erection of concrete or reinforced concrete constructions.

The manner, according to application no. P-329 432, consists of dry mixing the powdered activator with powdered, priorly ground waste glass, in proportion of 1.5 to 2.5% activator and 97.5 to 98.5% glass dust. When the mixture obtains a uniform structure, it is poured in thin layer on a belt conveyor moving inside the furnace, and then it is heated to the temperature of 750 to 950° C. for a specified amount of time, and then rapidly cooled down. The dust poured on the conveyor belt, before heating, is grooved, by creating narrow strips connected with a thin layer formed between the poured powder. During rapid cooling, the formed strips crack, forming small lumps of granulated glass. Size of the lumps can be freely shaped depending on the thickness of the formed strips, cooling temperature and contents of activator. The activator allowing for foaming of the ground waste glass and production of such granulated glass is composed of 45 to 95 weight units of silicon carbide and 1 to 10 weight units of carbon, preferably in the form of soot and 20 to 50 weight units of borax or 1 to 10 weight units of manganese oxide or 20 to 26 weight units of lead oxide together with 20 to 26 weight units of copper oxide.

The substance of solution consisting in obtainment manner of mass for production of shaped construction elements, based on the fact, that in the mechanical mixer the ceramic granulate is placed, preferably in the form of perlite and is soaked, preferably in water until total soaking of the granulate and is mixed with a binding agent, preferably with plaster with improved parameters, until obtainment of the state, where each loose granulate grain is covered with a layer of moist binding agent, creating a coating around the grain. Priorly prepared moulds are filled with the obtained mass and the mass is then subjected to stress treatment until obtainment of connection of individual granulate grains only with part of the surface, so there are free spaces left between the grains, filled with air. Stress treatment shall be applied until the pattern of the mould is impressed in the lump of construction element.

The mass for production of shaped construction elements, in accordance with the invention, consists of 15-25% of bond weight, preferably in the form of perlite, 35-45% of binding agent weight, preferably in the form of plaster with improved quality and 35-45% of water weight.

Solution in accordance with the invention allows for production of individual construction elements with maintenance of hight precision of performance and repetition of the individual elements, constituting the system for construction of foundations, walls, ceilings and roofs of buildings. Owing to spatial distribution of bond grains, surrounded with microscopic construction of hardened binding agent in the mass for production of elements, these elements are characterized with significant resistance to stress with simultaneous maintenance of high thermal insulation which is particularly valuable in use for construction substances structures. Construction elements produced with the manners and of the mass, in accordance with the invention, are resistant to biological factors such as mildew, fungi, rodents, lichen.

The subject matter of the invention explained on the attached drawing, illustrating a construction element with a detail showing the structure of mass of which it was produced. Contents of mass was presented in the example.

EXAMPLE

In order to obtain 100 kg of mass for production of shaped construction elements, in accordance with the invention, the following need to be used:
   18.0 kg of bond in the form of granulated perlite
   41.0 kg of binding agent in the form of plaster with improved quality
   41.0 kg of water In priorly prepared mechanical mixer, 18 kg of bond material in the form of perlite is mixed with 41 kg of water until total soaking of perlite grains surface. Further, to the mass obtained in such manner, 41 kg of binding agent is added in the form of plaster and is mixed until obtainment of coating of each loose grain of 1 perlite with coating of 2 moist binding agent. When the mass becomes a collection of identically formed loose grains 1 each coated with a layer of 2 moist binding agent, priorly prepared moulds are filled with it. The mass in moulds is subjected to stressing treatment, so that individual grains 1 only contacted each other partially, with maintenance of free spaces 3 between the coated grains 1. Free spaces 3 are filled with air. By stressing, impression on the element lump will be made of the mould shape. After forming, the completed elements are taken out of the moulds and left until obtainment of proper construction and resistance parameters.

The invention claimed is:

1. A method of obtaining a mass for production of shaped construction elements comprising:
   placing in a mechanical mixer, a granulate in the form of perlite,
   soaking the granulate in water, until complete soaking of the granulate
   mixing the water soaked granulate with a binding agent in the form of plaster until obtainment of a mass in which the loose grains of the granulate are coated with a layer of moist plaster binding agent,
   placing the obtained mass in previously prepared moulds,
   compressing the obtained mass in the moulds until parts of the surfaces of the coated grains of the granulate are connected, so that there is free space maintained between the coated grains of granulate, filled with air.

2. A mass for production of shaped construction elements, consisting essentially of 15-25% by weight of perlite, 35-45% by weight of a binding agent in the form of plaster, and 35-45% by weight of water.

3. Shaped construction elements produced according to the method of claim 1.

4. The method according to claim 1, wherein the obtained mass comprises:
   15-25% by weight of perlite,
   35-45% by weight of a binding agent in the form of plaster, and
   35-45% by weight of water.

* * * * *